(No Model.)
L. EBERHART & I. D. STEVENS.
CHECK ROW ATTACHMENT FOR SEED PLANTERS.
No. 296,151. Patented Apr. 1, 1884.
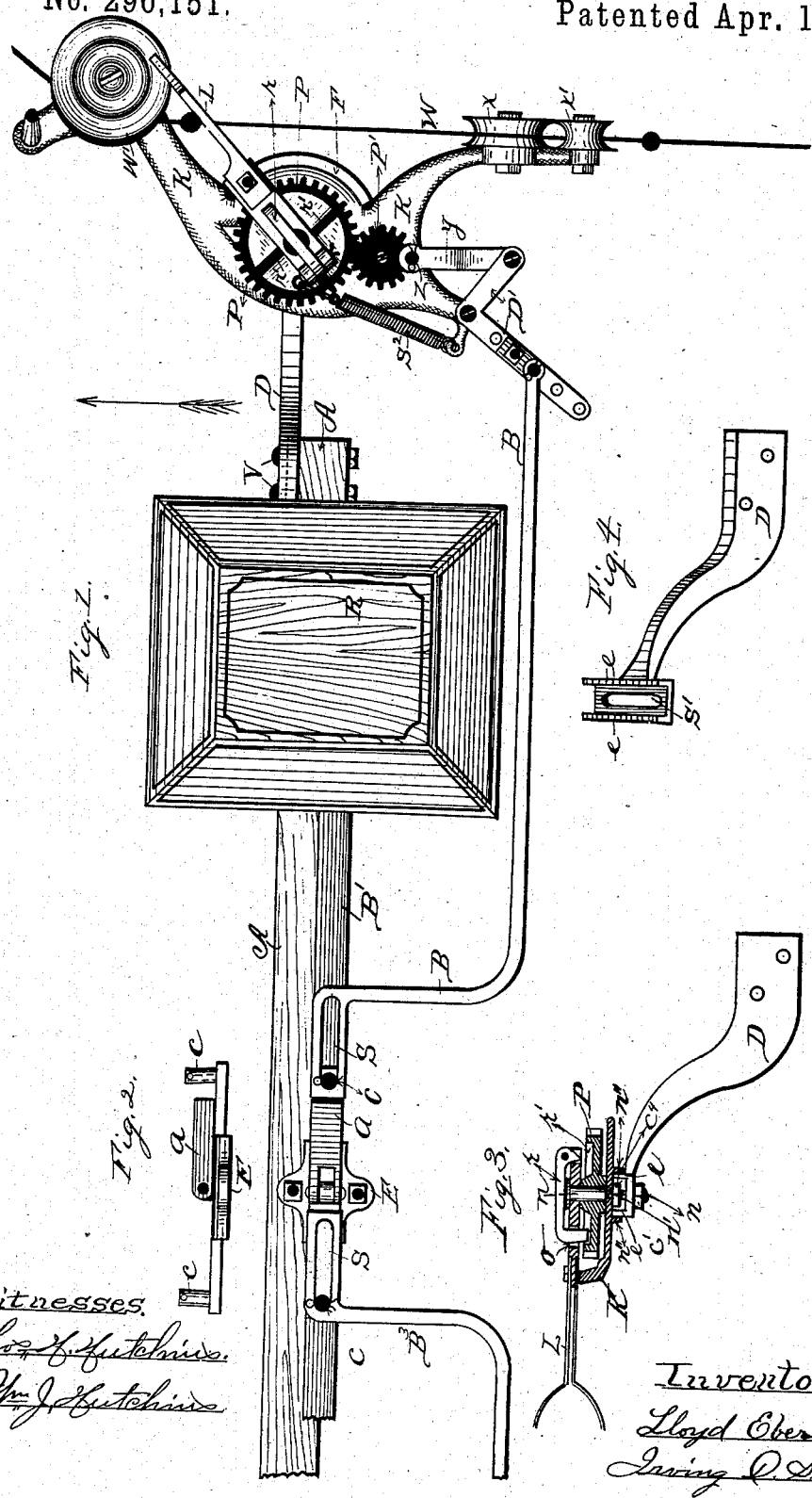
Witnesses
Thos. H. Hutchins.
Wm. J. Hutchins
Inventors.
Lloyd Eberhart.
Irving D. Stevens

UNITED STATES PATENT OFFICE.

LLOYD EBERHART AND IRVING D. STEVENS, OF JOLIET, ILLINOIS.

CHECK-ROW ATTACHMENT FOR SEED-PLANTERS.

SPECIFICATION forming part of Letters Patent No. 296,151, dated April 1, 1884.

Application filed December 6, 1883. (No model.)

*To all whom it may concern:*

Be it known that we, LLOYD EBERHART and IRVING D. STEVENS, citizens of the United States of America, residing at Joliet, in the county of Will and State of Illinois, have invented certain new and useful Improvements in Check-Row Attachments for Seed-Planters, of which the following is a specification, reference being had therein to the accompanying drawings.

Figure 1 is a plan view on the top; Fig. 2, a side view of the stud-plate E, that attaches to the seed-slide B'; Fig. 3, a vertical section through the center of pinion P and longitudinal section through forked lever L, supposing it to be standing on a line parallel with beam A; and Fig. 4, a perspective view of the arm D, for attaching the cross-head P to the beam A.

This invention relates to certain improvements in check-row attachments for seed-planters, the construction and operation of which we will fully set forth in the following specification and claims.

Referring to the drawings, $k$ represents the cross-head of the machine, bearing the ordinary guide-sheaves, $w'$, $x$, and $x'$, for guiding the knotted wire or cord $w$, which cross-head attaches (one at either end) to the beam A of the planter by means of the arm D and bolts $v$ $v$, immediately outside of the seed-hopper R. The cross-head $k$ also bears the horizontal pinions P and P', pivoted by means of proper studs to the cross-head $k$, so they will mesh with each other, as shown in Fig. 1, the pinion P being intended to be twice as large in diameter as pinion P'. The forked lever L pivots to the stud $n$ of pinion P, as shown more particularly in Fig. 3, which said stud stands shouldered on cross-head $k$, and has its lower end screw-threaded, and extends down through arm D, which is held thereto by the nut $c'$. The nut $n'$ securely attaches the stud $n$ to the cross-head $k$. The lower end of stud $n$ passes through the slot S' (shown in Fig. 4) of arm D, between the flanges $e$ $e$, the height of which leaves room for the nut $n'$, as shown in Fig. 3. The flanges $e$ $e$ stand between the flanges $n''$ $n''$, which are integral with cross-head $k$. These flanges $n''$ $n''$ prevent rotation of the cross-head on the arm D. The use of the slot S' in the arm D is to furnish means for moving the cross-head $k$ horizontally forward or backward by loosening the nut $c'$, for the purpose of causing the machine to check in line with the previously-dropped row. Sometimes the knotted wire $w$ gets moved by a strain on it, so its knots are not exactly in line with the row. When that has occurred, the head $k$ can be moved either forward to cause the forked lever L to strike the knot sooner, or be moved back to cause the lever L to strike the knot later, than it would, so that by means of such adjustment, which can be made almost instantly, the grain can always be dropped exactly in line with the previously-dropped row without having to disturb the anchors that hold the knotted wire at either end of the field.

The forked lever L is constructed with a latch, $r$, hinged thereto, as shown in Figs. 1 and 3, the hooked end of which passes through the forked lever through a slot or hole, $o$, and extends downward far enough to engage with four radial equidistant vertical offsets, $r'$, on the upper face of the pinion P. The forked lever L is provided on its pivoted end on the top with the latch $r$, which is pivoted at its rear end into the rear end of said lever, as shown in Figs. 1 and 3. The other end of said latch is bent to turn downward to pass through a slot or opening through said lever forward of the stud $n$, on which said lever pivots. This enables the said latch, by its own gravity, to fall consecutively behind one of a series of four equidistant vertical radial offsets, $r'$, on the upper face of pinion P, so that when forked lever L moves backward said latch will catch behind the vertical face of one of said offsets, and thereby rotate said pinion until said lever L stops. The sides of said offsets opposite their vertical faces are inclined, so the latch can pass over it and drop down behind its vertical face. The pinion P is by this means rotated intermittently in one direction one-fourth of its circumference at once, and by means of its meshing with the smaller pinion, P', will rotate it intermittently one-half way around. Pinion P' is provided with a wrist-pin $z$, on which the link $y$ is pivoted, and by means of which link the bell-crank D' is connected to said pinion. The said bell-crank is pivoted at its elbow on the top of the head K, as shown in Fig. 1, one of its arms being attached to said link and the other to the connecting-rod B. Rotation of pinion P' will reciprocate the connecting-rod B, which attaches at its outer end to the seed-slide, which is reciprocated by it. The arm of the bell-crank to which the connecting-rod B attaches is provided with a row of holes to furnish means for adjusting the length of the stroke of the connecting-rod B. The coil-spring $S^2$ returns the forked lever to the position shown in Fig. 1 after the knot has passed out of the lever.

As shown in Fig. 1, the machine is to travel in the direction of the arrow, and the forked lever L is just about to be carried backward by a knot on the stationary wire $w$. After it has been moved backward as far as the turned-up ends on the segment-track F will permit it, and the knot has passed out of the lever, and the spring $S^2$ has returned the said lever to the position shown in said figure, the small pinion P' will have been rotated just one-half way around, and the wrist-pin $z$ will stand in exactly the opposite position from that shown, and the connecting-rod B will have reciprocated or moved the seed-slide B' once, and so on each revolution of pinion P' will move the seed-slide once each way. The pinions P and P' are so set in relation to each other that the wrist-pin $z$ is always left in a line with the axes of said pinions at each reciprocation of the seed-slide, as shown in Fig. 1, so that the seed-slide stands locked and cannot move by any other means than by means of the movement of the forked lever described. It often occurs that as the seed-slide moves very easily, it will, unless locked in some way, move by means of the unevenness of the ground or some other cause before it should move to drop the seed at the right place; hence the necessity of locking it either way at each reciprocation, and the means shown is one very effectual for the purpose.

The inner ends of the connecting-rods B are provided with the slot S, through which the studs $c$ stand. These studs $c$ $c$ are integral with plate E, which is bolted to the seed-slide B'. This plate E is provided on its upper side, at the center, as shown in Figs. 1 and 2, with the arm $a$, pivoted thereto in such manner that it can be turned to lie horizontally in either direction on said plate, so as to alternately prevent reciprocation of the slotted end S of the connecting-rod B on the stud $c$, as shown in Fig. 2. This swinging arm $a$ is for the purpose of permitting the check-rower at the opposite side of the machine to stand still, so as to not be worn when unnecessary. Looking at Fig. 1, the arm $a$ is shown as turned toward connecting-rod B, which prevents the stud $c$ from traversing the slot S, and by that means causes connecting-rod B to reciprocate the seed-slide B'. The slot S in the opposite connecting-rod $B^3$ is left free, so the other stud $c$ can traverse it, and thus permit said connecting-rod to lie still while the other reciprocates the seed-slide, so that said connecting-rods alternately reciprocate the seed-slide and alternately lie still, so as not to wear the opposite check-rower on the other end of the machine while the one shown in Fig. 1 is operating. When the end of the field is reached and the knotted wire $w$ is changed to the opposite check-rower, then the lever $a$ is thrown over in the opposite direction from that shown in Fig. 1, when connecting-rod $B^3$ will reciprocate the seed-slide and connecting-rod B will lie idle, for the purpose stated. The slot S in the arm D also furnishes means for adjusting the head to any planter, as all planters are not alike, and the head cannot always be set the same on every planter.

Having thus described our invention, what we claim as new, and desire to secure by Letters Patent, is as follows, to wit:

1. The combination of the beam A of a planter, the arm D, having the slot S' and flanges $e$ $e'$, head $k$, having the flanges $n''$ $n''$, sheaves $w'$, $x$, and $x'$, pinion P, having the radial vertical offsets $r'$, pinion P', having the wrist-pin $z$, stud $n$, forked lever L, having the latch $r$, coil-spring $S^2$, link $y$, bell-crank D', and connecting rod B, having the slot S, as and for the purpose set forth.

2. In the check-rower described, the pinion P, having the radial vertical offsets $r'$, in combination with the forked lever L, having the latch $r$, pinion P', having the wrist-pin $z$, coil-spring $S^2$, stud $n$, and bell-crank D', as and for the purpose set forth.

3. In the check-rower described, the combination of the beam A, arm D, having the slot S' and flanges $e$ $e$, head $k$, having the flanges $n''$ $n''$ and bolt $n$, and nuts $c'$ and $c^4$, as and for the purpose set forth.

4. In the check-rower described, the head $k$, adapted to have horizontal adjustment forward and backward on the arm D, as and for the purpose set forth.

5. In the check-rower described, the combination of the pinions P and P', link $y$, bell-crank D', and connecting-rod B, the said pinions set in the described relation to each other, so that at each half-revolution of pinion P' its wrist-pin $z$ and link $y$ will be left in line with the axes of said pinions, to lock the seed-slide B' in either direction, as set forth.

6. In the check-rower described, the combination of the seed-slide B', plate E, having the studs $c$ $c$ and centrally-pivoted swinging arm $a$, connecting-rods B and $B^3$, having the slots S S, bell-crank D', link $y$, pinions P and P', and oscillating forked lever L, having the latch $r$, all adapted to operate as and for the purpose set forth.

7. In the check-rower described, the bolt or stud $n$, having the lock-nut $c^4$ and nut $c'$, and adapted to secure the forked lever L and pinion P in position on the head $k$, and to secure the head $k$ to the arm D, as and for the purpose set forth.

LLOYD EBERHART.
IRVING D. STEVENS.

Witnesses:
THOS. H. HUTCHINS,
WM. J. HUTCHINS.